(12) United States Patent
Hollier et al.

(10) Patent No.: US 7,715,592 B1
(45) Date of Patent: May 11, 2010

(54) ANALYSIS OF VIDEO SIGNAL QUALITY

(75) Inventors: Michael P. Hollier, Woodbridge (GB); Alexandre Bourret, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/889,041

(22) PCT Filed: Jan. 24, 2000

(86) PCT No.: PCT/GB00/00171

§ 371 (c)(1),
(2), (4) Date: Jul. 11, 2001

(87) PCT Pub. No.: WO00/48407

PCT Pub. Date: Aug. 17, 2000

(30) Foreign Application Priority Data

| Feb. 11, 1999 | (GB) | ................................. | 9903107.2 |
| Feb. 12, 1999 | (GB) | ................................. | 9903293.0 |
| Jun. 18, 1999 | (EP) | ................................. | 99304824 |

(51) Int. Cl.
*G06K 9/00* (2006.01)
(52) U.S. Cl. .................................. 382/112; 348/192
(58) Field of Classification Search .................. 382/112
See application file for complete search history.

(56) References Cited

U.S. PATENT DOCUMENTS 5,253,306 A * 10/1993 Nishio .................... 382/112
5,446,492 A   8/1995 Wolf et al.
5,550,580 A * 8/1996 Zhou ...................... 348/14.1

(Continued)

FOREIGN PATENT DOCUMENTS

DE         19521408 C1    12/1996

(Continued)

OTHER PUBLICATIONS

Wolf, S., Cermak, G.W., "Objective and Subjective Measures of MPEG Video Quality," 139th SMPTE Technical Conference, New York City, Nov. 21-24, 1997.*

(Continued)

*Primary Examiner*—Sath V Perungavoor
(74) *Attorney, Agent, or Firm*—Nixon & Vanderhye P.C.

(57) ABSTRACT

Two video signals, typically an original signal and a degraded version of the same signal, are analyzed firstly to identify perceptually relevant boundaries of elements forming video images depicted therein. These boundaries are then compared to determine the extent to which the properties of the boundaries defined in one image are preserved in the other, to generate an output indicative of the perceptual difference between the first and second signals. The boundaries may be defined by edges, color, luminance or texture contrasts, disparities between frames in a moving or stereoscopic image, or other means. The presence, absence, difference in clarity or difference in means of definition of the boundaries is indicative of the perceptual importance of the differences between the signals, and therefore of the extent to which any degradation of the signal will be perceived by the human viewer of the resulting degraded image. The results may also be weighted according to the perceptual importance of the image depicted—for example the features which identify a human face, and in particular those responsible for visual speech cues.

19 Claims, 3 Drawing Sheets

U.S. PATENT DOCUMENTS

| | | | |
|---|---|---|---|
| 5,574,500 A * | 11/1996 | Hamada et al. | 348/180 |
| 5,589,884 A | 12/1996 | Ohguchi | |
| 5,596,364 A * | 1/1997 | Wolf et al. | 348/192 |
| 5,694,491 A * | 12/1997 | Brill et al. | 382/260 |
| 5,734,744 A * | 3/1998 | Wittenstein et al. | 382/166 |
| 5,790,717 A * | 8/1998 | Judd | 382/323 |
| 5,799,133 A | 8/1998 | Hollier et al. | |
| 5,940,124 A * | 8/1999 | Janko et al. | 348/189 |
| 5,974,159 A * | 10/1999 | Lubin et al. | 382/106 |
| 5,991,458 A * | 11/1999 | Kunitake et al. | 382/254 |
| 6,014,183 A | 1/2000 | Hoang | |
| 6,026,180 A * | 2/2000 | Wittenstein et al. | 382/166 |
| 6,057,882 A * | 5/2000 | van den Branden Lambrecht et al. | 348/192 |
| 6,061,464 A * | 5/2000 | Leger | 382/124 |
| 6,075,884 A * | 6/2000 | Lubin et al. | 382/156 |
| 6,119,083 A | 9/2000 | Hollier et al. | 704/243 |
| 6,137,904 A | 10/2000 | Lubin et al. | 382/162 |
| 6,360,022 B1 | 3/2002 | Lubin et al. | 382/260 |
| 6,363,116 B1 | 3/2002 | Edwards et al. | 375/240.21 |
| 6,493,023 B1 | 12/2002 | Watson | 348/180 |
| 6,690,839 B1 | 2/2004 | Ferguson | 382/274 |
| 6,704,451 B1 | 3/2004 | Hekstra et al. | 382/199 |
| 6,943,827 B2 | 9/2005 | Kawada et al. | 348/180 |
| 7,136,511 B2 | 11/2006 | Harrington et al. | 382/112 |
| 2002/0015508 A1* | 2/2002 | Hannigan et al. | 382/100 |
| 2007/0036393 A1 | 2/2007 | Harrington et al. | 382/112 |
| 2009/0244289 A1 | 10/2009 | Raake et al. | 348/180 |

FOREIGN PATENT DOCUMENTS

EP           0938239 A1    8/1999

OTHER PUBLICATIONS

Wolf, S., Pinson, M.,Webster, A., Cermak, G., Tweedy, E.P., "Objective and Subjective Measures of MPEG Video Quality," ANSI T1A1 contribution No. T1A1.5/96-121, Oct. 28, 1996.*

Wolf, S., "Measuring the End-to-End Performance of Digital Video Systems," IEEE Trans. Broadcast., vol. 43, No. 3, pp. 320-328, Sep. 1997.*

A. W. Rix, A. Bourret and M. P. Hollier, "Models of Human Perception", Jan. 1999, ISSN: 1358-3948, vol. 17, No. 1, pp. 24 -34.*

Luo, J., Chen, C.W. Parker, K.J., "Face Location in Wavelet-Based Video Compression for High Perceptual Quality Videoconferencing", Circuits and Systems for Video Technology, IEEE Transactions on, Aug. 1996, ISSN: 1051-8215.*

Westen, S.J.P., Lagendijk, R.L., Biemond, J., "Perceptual Image Quality Based on a Multiple Channel HVS Model", Acoustics, Speech, and Signal Processing, 1995. ICASSP-95., 1995 International Conference on, May 9-12, 1995, ISBN: 0-7803-2431-5.*

Quincy, E.A., "Video Quality Gradient Measures for Digital Networks", Military Communications Conference, 1990. MILCOM '90, Conference Record, 'A New Era'. 1990 IEEE, Sep. 30-Oct. 3, 1990, vol. 1, pp. 289-296.*

Lambrecht Van den Branden, C., J., Verscheure, O., "Perceptual Quality Measure using a Spatio-Temporal Model of the Human Visual System", Digital Video Compression: Algorithms and Technologies 1996, Vasudev Bhaskaran, Frans Sijstermans, Sethuraman Panchanathan, Editors, Mar. 1996, pp. 450-461.*

Namuduri, K.R., Murenzi, R., Kaplan, L.M., "Scale-Based Approach for Image Quality Evaluation", Very High Resolution and Quality Imaging III, V. Ralph Algazi, Andrew G. Tescher, Editors, Apr. 1998, pp. 36-43.*

Dariush, B., Kang, S.B., Waters, K., "Spatiotemporal Analysis of Face Profiles: Detection, Segmentation, and Registration", Automatic Face and Gesture Recognition, 1998. Proceedings. Third IEEE International Conference on, Apr. 14-16, 1998, ISBN: 0-8186-8344-9.*

Bhasharan, V., Konstantinides, K., Beretta, G., "Text and Image Sharpening of Scanned Images in the JPEG Domain", Image Processing, 1997. Proceedings., International Conference on, Oct. 26-29, 1997, INSPEC Accession No. 5899875.*

Huang, W., Sun, Q., Lam, C.P., Wu, J.K., "A Robust Approach to Face and Eyes Detection from Images with Cluttered Background", Pattern Recognition, 1998. Proceedings. Fourteenth International Conference on, Aug. 16-20, 1998, ISBN: 0-8186-8512-3.*

Rix et al, "Models of Human Perception", BT Technology Journal, vol. 17, No. 1, Mar. 19, 1999, pp. 24-34, XP000824576.

Tan et al, "An Objective Measurement Tool for MPEG Video Quality", Signal Processing, European Journal Devoted to the Methods and Applications of Signal Processing, vol. 70, 1998, pp. 279-294, XP004144970.

Franti, "Image Quality Measure Based on Local Visual Properties", Picture Coding Symposium 97, Sep. 10-12, 1997, No. 143, pp. 217-220.

US Application of Bourret, U.S. Appl. No. 10/275,474, filed Nov. 6, 2002.

US Application of Bourret, U.S. Appl. No. 10/221,780, filed Sep. 17, 2002.

* cited by examiner

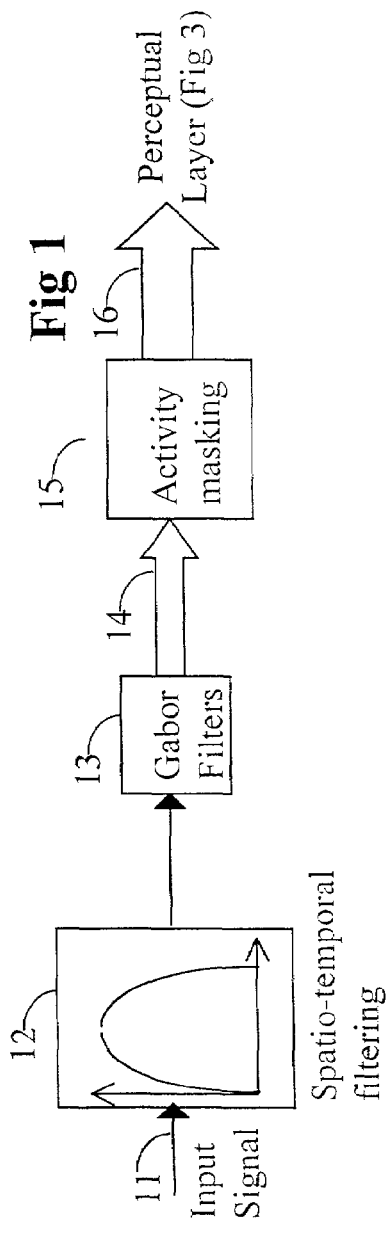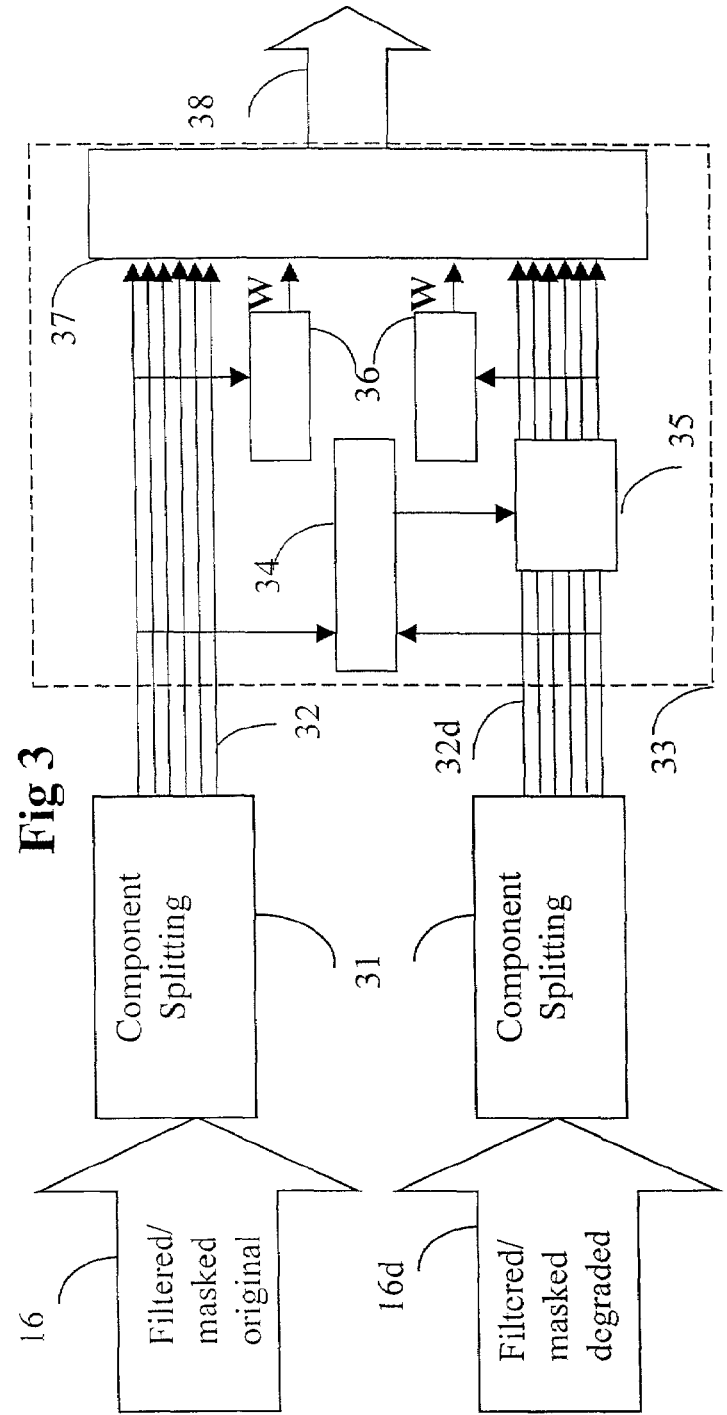

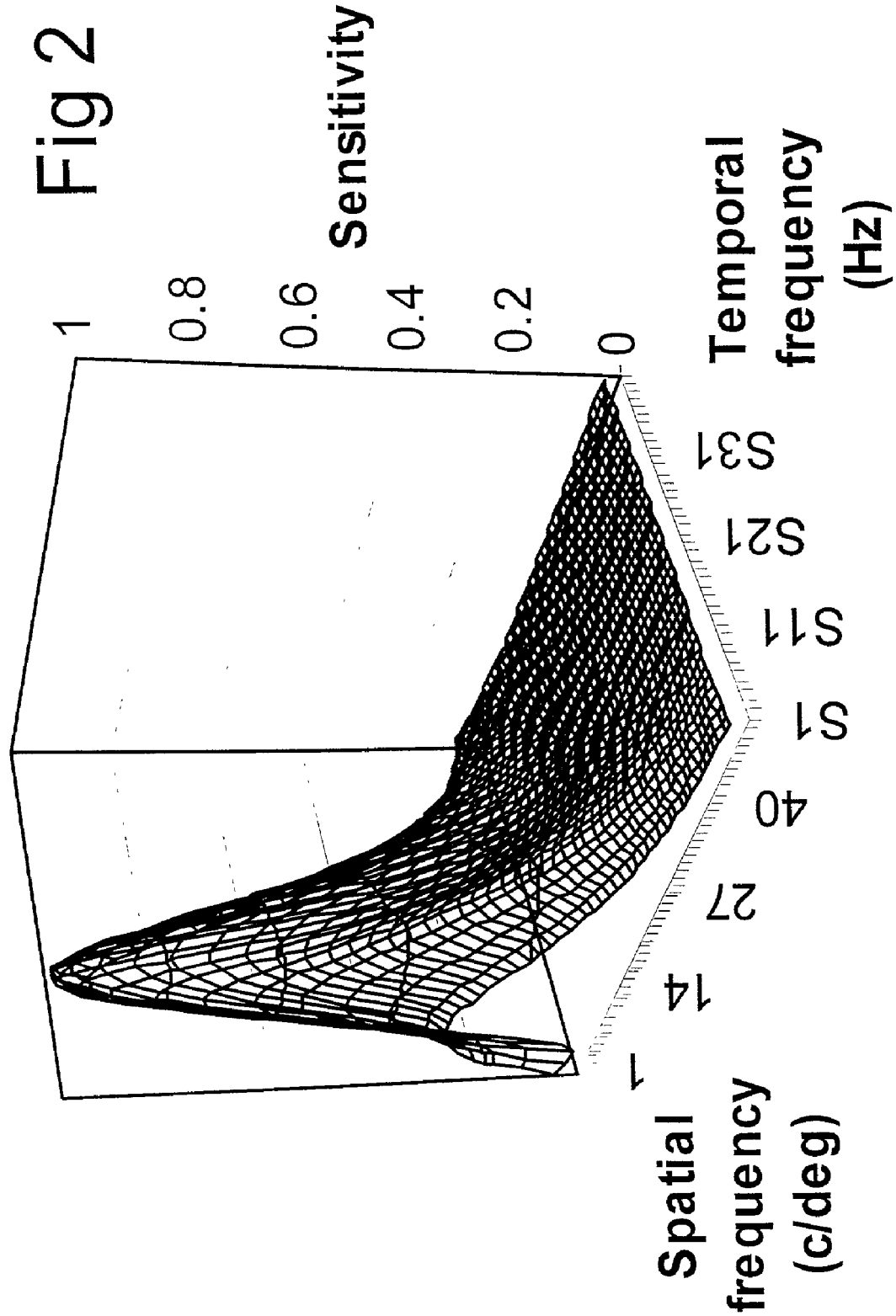

ANALYSIS OF VIDEO SIGNAL QUALITY

BACKGROUND

1. Technical Field

This invention relates to the analysis of the quality of video signals. It has a number of applications in monitoring the performance of video transmission equipment, either during development, under construction, or in service.

2. Related Art

As communications systems have increased in complexity it has become increasingly difficult to measure their performance objectively. Modern communications links frequently use data compression techniques to reduce the bandwidth required for transmission. When signals are compressed for more efficient transmission, conventional engineering metrics, such as signal-to-noise ratio or bit error rate, are unreliable indicators of the performance experienced by the human being who ultimately receives the signal. For example, two systems having similar bit-error rates may have markedly different effects on the quality of the data (sound or picture) presented to the end user, depending on which digital bits are lost. Other non-linear processes such as echo cancellation are also becoming increasingly common. The complexity of modern communications systems makes them unsuitable for analysis using conventional signal processing techniques. End-to-end assessment of network quality must be based on what the customer has, or would have, heard or seen.

The main benchmarks of viewer opinion are the subjective tests carried out to International Telecommunications Union standards P.800, "Methods for subjective determination of transmission quality", 1996 and P.911 "Subjective audiovisual quality assessment methods for multimedia applications", 1998. These measure perceived quality in controlled subjective experiments, in which several human subjects listen to each signal under test. This is impractical for use in the continuous monitoring of a network, and also compromises the privacy of the parties to the calls being monitored. To overcome these problems, auditory perceptual models such as those of the present applicant's International Patent Specifications WO 94/00922, WO95/01011, WO95/15035, WO97/05730, WO97/32428, WO98/53589 and WO98/53590 are being developed for measuring telephone network quality. These are objective performance metrics, but are designed to relate directly to perceived signal quality, by producing quality scorings similar to those which would have been reported by human subjects.

The prior art systems referred to above measure the quality of sound (audio) signals. The present invention is concerned with the application of similar principles to video signals. The basic principle, of emulating the human perceptual system (in this case the eye/brain system instead of the ear/brain system) is still used, but video signals and the human visual perceptual system are both much more complex, and raise new problems.

As with hearing, the human visual perception system has physiological properties that make some features present in visual stimuli very difficult or impossible to perceive. Compression processes, such as those established by JPEG (Joint Pictures Expert Group) and MPEG (Motion Pictures Expert Group) rely on these properties to reduce the amount of information to be transmitted in video signals (moving or still). Two compression schemes may result in similar losses of information, but the perceived quality of a compressed version of a given image may be very different according to which scheme was used. The quality of the resulting images cannot therefore be evaluated by simple comparison of the original and final signals. The properties of human vision have to be included in the assessment of perceived quality.

It is problematic to try and locate information from an image by mathematical processing of pixel values. The pixel intensity level becomes meaningful only when processed by the human subject's visual knowledge of objects and shapes. In this invention, mathematical solutions are used to extract information resembling that used by the eye-brain system as closely as possible.

A number of different approaches to visual modelling have been reported. These are specialised to particular applications, or to particular types of video distortion. For example, the MPEG compression system seeks to code the differences between successive frames. At periods of overload, when there are many differences between successive frames, this process reduces the pixel resolution, causing blocks of uniform colour and luminance to be produced. Karunasekera, A. S., and Kingsbury, N. G., in "A distortion measure for blocking artefacts in images based on human visual sensitivity", IEEE Transactions on Image Processing, Vol. 4, No. 6, pages 713-724, June 1995, propose a model which is especially designed to detect "blockiness" of this kind. However, such blockiness does not always signify an error, as the effect may have been introduced deliberately by the producer of the image, either for visual effect or to obliterate detail, such as the facial features of a person whose identity it is desired to conceal.

If the requirements of a wide range of applications, from high definition television to video conferencing and virtual reality, are to be met, a more complex architecture has to be used.

Some existing visual models have an elementary emulation of perceptual characteristics, referred to herein as a "perceptual stage". Examples are found in the Karunasekera reference already discussed, and Lukas, X. J., and Budrikis, Z. L., "Picture Quality Prediction Based on a Visual Model", IEEE Transactions on Communications, vol. com-30, No. 7, pp. 1679-1692 July 1982, in which a simple perceptual stage is designed around the basic principle that large errors will dominate subjectivity. Other approaches have also been considered, such as a model of the temporal aggregation of errors described by Tan, K. T., Ghanbari, M. and Pearson, D. E., "A video distortion meter", Informationstechnische Gesellschaft, Picture Coding Symposium, Berlin, September 1997. However, none of these approaches addresses the relative importance of all errors present in the image.

BRIEF SUMMARY

For the purposes of the present specification, the "colour" of a pixel is defined as the proportions of the primary colours (red, green and blue) in the pixel. The "luminance" is the total intensity of the three primary colours. In particular, different shades on a grey scale are caused by variations in luminance.

According to a first aspect of the present invention, there is provided a method of measuring the differences between a first video signal and a second video signal, comprising the steps of:

analysing the information content of each video signal to identify the perceptually relevant boundaries of the video images depicted therein;

comparing the boundaries so defined in the first signal with those in the second signal; the comparison including determination of the extent to which the properties of the boundaries defined in the first image are preserved in the second image, and generating an output indicative of the perceptual difference between the first and second signals.

According to a second aspect of the present invention, there is provided apparatus for measuring the differences between a first video signal and a second video signal, comprising:

analysis means for the information content of each video signal, arranged to identify the perceptually relevant boundaries of the video images depicted therein;

comparison means for comparing the boundaries so defined in the first signal with those in the second signal; the comparison including determination of the extent to which the properties of the boundaries defined in the first image are preserved in the second image, and means for generating an output indicative of the perceptual difference between the first and second signals.

The boundaries between the main elements of an image may be identified by any measurable property used by the human perceptual system to distinguish between such elements. These may include, but are not limited to, colour, luminance, so-called "hard" edges (a narrow line of contrasting colour or luminance defining an outline or other boundary, such a line being identifiable in image analysis as a region of high spatial frequency), and others which will be discussed later.

The properties of the boundaries on which the comparison is based include the characteristics by which such boundaries are defined. In particular, if a boundary is defined by a given characteristic, and that characteristic is lost in the degraded image, the degree of perceived degradation of the image element is dependant on how perceptually significant the original boundary was. If the element defined by the boundary can nevertheless be identified in the degraded image by means of a boundary defined by another characteristic, the comparison also takes account of how perceptually significant such a replacement boundary is, and how closely its position corresponds with the original, lost, boundary.

The basis for the invention is that elements present in the image are not of equal importance. An error will be more perceptible if it disrupts the shape of one of the essential features of the image. For example, a distortion present on an edge in the middle of a textured region will be less perceptible than the same error on an independent edge. This is because an edge forming part of a texture carries less information than an independent edge, as described by Ran, X., and Favardin, N., "A Perceptually Motivated Three-Component Image Model—Part II: Application to Image Compression", IEEE Transactions on Image Processing, Vol. 4, No. 4, pp. 713-724, April 1995. If, however, a textured area defines a boundary, an error that changes the properties of the texture throughout the textured area can be as important as an error on an independent edge, if the error causes the textured characteristics of the area to be lost. The present invention examines the cognitive relevance of each boundary, and the extent to which this relevance is preserved.

The process identifies the elements of greatest perceptual relevance, that is the boundaries between the principal elements of the image. Small variations in a property within the regions defined by the boundaries are of less relevance than errors that cause the boundary to change its shape.

Moreover, the process allows comparison of this information independently of how the principal elements of the images are identified. The human perceptual system can distinguish different regions of an image in many different ways. For example, the absence of a "hard edge" will create a greater perceptual degradation if the regions separated by that edge are of similar colour than it will if they are of contrasting colours, since the colour contrast will still allow a boundary to be perceived. The more abrupt the change, the greater the perceptual significance of the boundary.

By analysing the boundaries defined in the image, a number of further developments become possible.

The boundaries can be used as a frame of reference, by identifying the principal elements in each image and the differences in their relative positions. By using differences in relative position, as opposed to absolute position, perceptually unimportant differences in the images can be disregarded, as they do not affect the quality of the resulting image as perceived by the viewer. In particular, if one image is offset relative to another, there are many differences between individual pixels of one image and the corresponding pixels of the other, but these differences are not perceptually relevant provided that the boundaries are in the same relative positions. By referring to the principal boundaries of the image, rather than an absolute (pixel co-ordinate) frame of reference, any such offset can be compensated for.

The analysis may also include identification of perceptually significant image features, again identified by the shapes of the boundaries identified rather than how these boundaries are defined. The output indicative of the perceptual difference between the first and second signals can be weighted according to the perceptual significance of such image features. Significant features would include the various characteristics which make up a human face, in particular those which are significant in providing visual speech cues. Such features are of particular significance to the human cognitive system and so errors such as distortion, absence, presence of spurious elements or changes in relative position are of greater perceptual relevance in those features than in others.

In an image containing text, those features which distinguish one character of a typeface from another (for example the serif on a letter "G" which distinguishes it from a "C") are perceptually significant.

BRIEF DESCRIPTION OF THE DRAWINGS

An embodiment of the invention will now be described, by way of example only, with reference to the Figures, in which:

FIG. 1 illustrates schematically a first, sensory emulation, stage of the system FIG. 2 illustrates the filter parameters used in the sensory emulation stage FIG. 3 illustrates schematically a second, perceptual, stage of the system

DETAILED DESCRIPTION OF EXEMPLARY EMBODIMENTS

Figure 5:
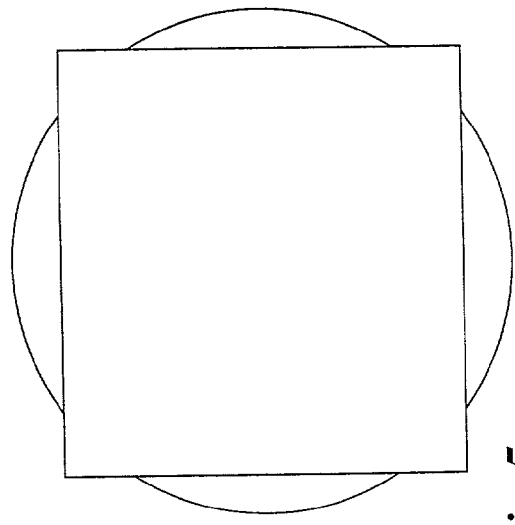
FIGS. 4, 5, 6 and 7 illustrate four ways in which boundaries may be perceived.

In this embodiment the measurement process comprises two stages, illustrated in FIGS. 1 and 3 respectively. The first—the sensory emulation stage—accounts for the physical sensitivity of the human visual system to given stimuli. The second—the perceptual stage—estimates the subjective intrusion caused by the remaining visible errors. The various functional elements shown in FIGS. 1 and 3 may be embodied as software running on a general-purpose computer.

The sensory stage (FIG. 1) reproduces the gross psychophysics of the sensory mechanisms:

(i) spatio-temporal sensitivity known as the human visual filter, and (ii) masking due to spatial frequency, orientation and temporal frequency.

FIG. 1 gives a representation of the sensory stage, which emulates the physical properties of the human visual system. The same processes are applied to both the original signal and the degraded signal: these may be carried out simultaneously in parallel processing units, or they may be performed for each signal in turn, using the same processing units.

The sensory stage identifies whether details are physically perceptible, and identifies the degree to which the visual system is sensitive to them. To do so, it emulates the two main characteristics of the visual system that have an influence on the physical perceptibility of a visual stimulus:

sensitivity of the eye/brain system masking effects—that is the variation in perceptual importance of one stimulus according to the presence of other stimuli.

Each of these characteristics has both a time and a space dimension, as will now be discussed.

Each signal is first filtered in temporal and spatial frequency by a filter 12, to produce a filtered sequence. The values used in the filter 12 are selected to emulate the human visual response, as already discussed in relation to FIG. 2. This filter allows details that are not visible to a human visual (eye/brain) system to be removed, and therefore not counted as errors, while the perceptibility of details at other spatial and temporal frequencies is increased by the greater sensitivity of the human sensory system at those frequencies. This has the effect of weighting the information that the signals contain according to visual acuity.

The human visual system is more sensitive to some spatial and temporal frequencies than others. Everyday experience teaches us that we cannot see details smaller than a certain size. Spatial resolution is referred to in terms of spatial frequency, which is defined by counting the number of cycles of a sinusoidal pattern present per degree subtended at the eye. Closely spaced lines (fine details) correspond to high spatial frequencies, while large patterns correspond to low spatial frequencies. Once this concept is introduced, human vision can be compared to a filter, with peak (mid-range) sensitivity to spatial frequencies of around 8 cycles/degree and insensitivity to high frequencies (more than 60 cycles/degree). A similar filter characteristic can be applied in the temporal domain, where the eye fails to perceive flickering faster than about 50 Hz. The overall filter characteristic for both spatial and temporal frequency can be represented as a surface, as shown in FIG. 2, in which the axes are spatial and temporal frequency (measured in cycles/degree and Hertz respectively). The vertical axis is sensitivity, with units normalised such that maximum sensitivity is equal to 1.

The second aspect of vision to be modelled by the sensory stage is known as "masking", the reduced perceptibility of errors in areas of an image where there is greater spatial activity present, and the temporal counterpart of this effect decreases the visibility of details as the rate of movement increases. Masking can be understood by considering the organisation of the primary cortex, the first stage of the brain responsible for visual processing. Each part of the cortex is sensitive to a certain region of the retina. The incoming image stream is divided into groupings (known as channels) of spatial frequency, temporal frequency and orientation. The "next stage" of the brain processes the image stream as a set of channels, each accounting for a combination of spatial/temporal frequency and orientation in the corresponding area of the retina. Once a given channel is excited, it tends to inhibit its neighbours, making it more difficult to detect other details that are close in proximity, spatial or temporal frequency, or orientation.

Masking is a measure of the amount of inhibition a channel causes to its neighbours. This information is obtained by studying the masking produced by representative samples of channels, in terms of spatial/temporal frequency and orientation characteristics. For the sensory stage to simulate activity masking, it is necessary to know the amount of activity present in each combination of spatial frequency and orientation within an image. This calculation can be performed using a Gabor function, a flexible form of bandpass filter, to generate respective outputs 14 in which the content of each signal is split by spatial frequency and orientation. Typically, sixteen output channels are used for each output signal, comprising four spatial orientations (vertical, horizontal, and the two diagonals) and four spatial frequencies. The resulting channels are analysed by a masking calculator 15. This calculator modifies each channel in accordance with the masking effect of the other channels; for example the perceptual importance of a low spatial-frequency phenomenon is reduced if a higher frequency spatial phenomenon is also present. Masking also occurs in the temporal sense—certain features are less noticeable to the human observer if other effects occur within a short time of them.

Calibration of this model of masking requires data describing how spatial/temporal frequency of a given orientation decreases the visibility of another stimulus. This information cannot be obtained as a complete description as the number of combinations is very large. Therefore, the separate influence of each parameter is measured. First the masking effect of a background on a stimulus is measured according to the relative orientation between the two. Then the effect of spatial and temporal frequency difference between masker and stimulus is measured. Finally, the two characteristics are combined by interpolating between common measured points.

In a simple comparison between original and degraded frames, certain types of error, such as a horizontal/vertical shift, result in large amounts of error all over the frame, but would not be noticeable to a user. This problem can be addressed by employing frame realignment, as specified in the ITU-T "*Draft new recommendation on multimedia communication delay, synchronisation, and frame rate measurement*", COM 12-29-E, December 1997. However this simple method does not fully account for the subjectivity of the error, since it does not allow for other common defects such as degradation of elements in the compressed sequence.

Following the sensory stage, the image is decomposed to allow calculation of error subjectivity by the perceptual stage (FIG. 3), according to the importance of errors in relation to structures within the image. If the visible error coincides with a critical feature of the image, such as an edge, then it is more subjectively disturbing. The basic image elements, which allow a human observer to perceive the image content, can be thought of as a set of abstracted boundaries. These boundaries can be formed by colour and luminance differences, texture changes and movement as well as edges, and are identified in the decomposed image. Even some "Gestalt" effects, which cause a boundary to be perceived where none actually exists, can be algorithmically measured to allow appropriate weighting.

These boundaries are required in order to perceive image content and this is why visible errors that degrade these boundaries, for example by blurring or changing their shape, have greater subjective significance than those which do not. The output from the perceptual stage is a set of context-sensitive error descriptors that can be weighted differently to map to a variety of opinion criteria.

In some instances, a boundary may be completely absent, or a spurious boundary may be present, for example when a "ghost" image is formed by multipath reflection. In this case, the presence or absence of the boundary itself is the error.

FIG. 3 is a representation of the perceptual stage, which measures the subjective significance of any errors present in the image sequence. The original signal 16 and the degraded signal 16d, each filtered and masked as described with reference to FIG. 1, are first each analysed (either in parallel or sequentially) in a component extraction process 31 to identify characteristics of the edges or boundaries of the principal components of each image. These characteristics are supplied as inputs 32, 32d to a comparison process 33 which generates an output 38 indicative of the overall perceptual degradation of the degraded image with respect to the original image.

The components identified by the extraction process 31 may be distinguished by:

Luminance (illustrated in FIG. 4) and Colour
Strong Edges (illustrated in FIG. 5)
Closure Effects (illustrated in FIG. 6)
Texture (illustrated in FIG. 7)
Movement
Binocular (Stereoscopic) Disparities These last two effects rely on phenomena relating to movement and stereoscopy, not readily illustrated on the printed page. For similar reasons, only luminance differences, and not colour differences, are illustrated in FIG. 4.

Figure 4:
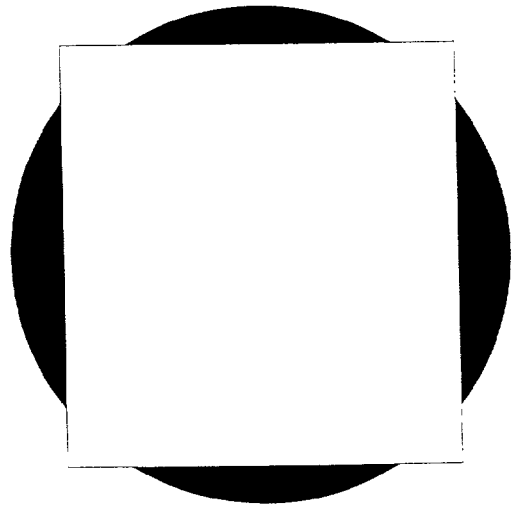

FIGS. 4 to 7 all depict a circle and a square, the square obscuring part of the circle. In each case, the boundary between the two elements is readily perceived, although the two elements are represented in different ways. In FIG. 4, the circle and square have different luminance—the circle is black and the square is white. A boundary is perceived at the locations where this property changes. It will be noted that in FIGS. 5, 6 and 7 there are also locations where the luminance changes, (for example the boundaries between each individual stripe in FIG. 7) but these are not perceived as the principal boundaries of the image.

FIG. 5 illustrates a boundary defined by an edge. A "strong edge", or outline, is a narrow linear feature, of a colour or luminance contrasting with the regions on either side of it. The viewer perceives this linear feature not primarily as a component in its own right, but as a boundary separating the components either side of it. In analysis of the image, such an edge can be identified by a localised high-frequency element in the filtered signal. Suitable processes identifying edges have been developed, for example the edge extraction process described by S M Smith and J M Brady in "*SUSAN—A new approach to low-level image processing*" (*Technical Report TR95SMS1c, Oxford Centre for Functional magnetic Resonance Imaging of the Brain*, 1995).

Figure 6:
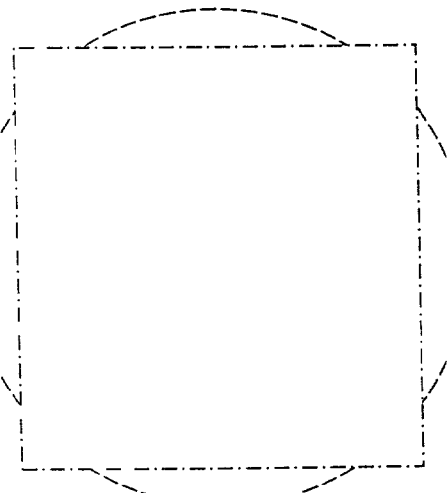

In many circumstances a viewer can perceive an edge where no continuous line is present. An example is shown in FIG. 6, where the lines are discontinuous. The human perceptual system carries out a process known as "closure", which tends to complete such partial edges. (A further example is illustrated by the fact that none of FIGS. 4 to 7 actually depict a full circle. The viewer infers the presence of a circle from the four lenticular regions actually depicted in each Figure). Various processes have been developed to emulate the closure process carried out by the human perceptual system. One such process is described by Kass M., Witkin A., and Terzopoulos D., "*Snakes: Active Boundary Models*", published in the *Proceedings of First International Conference on Computer Vision* 1987, pages 259-269.

Figure 7:
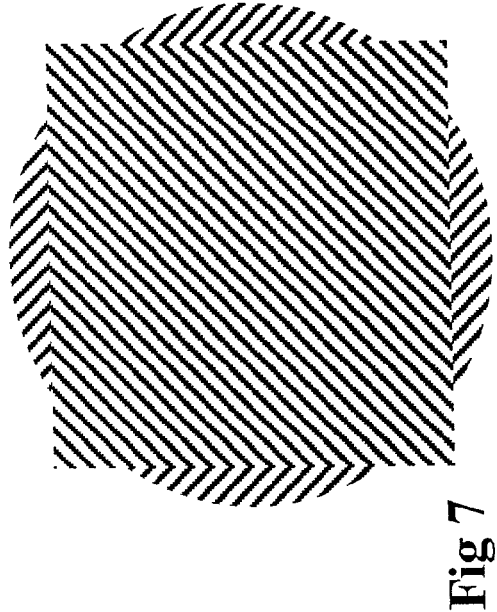

"Texture" can be identified in many regions in which the properties already mentioned are not constant. For example, in a region occupied by parallel lines, of a colour or luminance contrasting with the background, the individual location of each line is not of great perceptual significance. However, if the lines have different orientations in different parts of the region, an observer will perceive a boundary where the orientation changes. This property is found for instance in the orientation of brushstrokes in paintings. An example is shown in FIG. 7, in which the circle and square are defined by two orthogonal series of parallel bars. Note that if the image is enlarged such that the angular separation of the stripes is closer to the peak value shown in FIG. 2, and the dimensions of the square and circle further from that peak value, the individual stripes would become the dominant features, instead of the square and circle. It will also be apparent that if the orientations of the bars were different, the boundary between the square and the circle may become less distinct. To identify the texture content of a region of the image, the energy content in each channel output from the Gabor filters 13 is used. Each channel represents a given spatial frequency and orientation. By identifying regions where a given channel or channels have high energy content, regions of similar texture can be identified.

Shapes can be discerned by the human perceptual system in other ways, not illustrated in the accompanying drawings. In particular, disparities between related images, such as the pairs of image frames used in stereoscopy, or successive image frames in a motion picture, may identify image elements not apparent on inspection of a single frame. For example, if two otherwise similar images, with no discernible structure in either individual image, include a region displaced in one image in relation to its position in the other, the boundaries of that region can be discerned if the two images are viewed simultaneously, one by each eye. Similarly, if a region of apparently random pixels moves coherently across another such region in a moving image, that region will be discernible to an observer, even though no shape would be discernible in an individual frame taken from the sequence. This phenomenon is observable in the natural world—there are many creatures such as flatfish which have colouring similar to their environment, and which are only noticeable when they move.

The component extraction process identifies the boundaries of the principal elements of both the original and degraded signals. The perceptual importance of each boundary depends on a number of factors, such as its nature (edge, colour change, texture, etc), the degree of contrast involved, and its context. In this latter category, a high frequency component to the filtered and masked signal will signify that there are a large number of individual edges present in that region of the image. This will reduce the significance of each individual edge—compare FIG. 5, which has few such edges, with FIG. 7, which has many more such edges.

Each individual extraction process carried out in the component splitting step 31, on its own, typically performs relatively poorly, as they all tend to create false boundaries, and fail to detect others. However, the combination of different processes increases the quality of the result, a visual object being often defined by many perceptual boundaries, as discussed by Scassellati B. M in "*High-level perceptual contours from a variety of low-level physical features*" (Master Thesis, Massachusetts Institute of Technology, May 1995). For this reason the comparison process 33 compares all the boundaries together, regardless of how they are defined except insofar as this affects their perceptual significance, to produce a single aggregated output 38.

The results 32, 32d of the component analysis 31 are passed to a comparison process 33, in which the component boundaries identified in each signal are compared. By comparing the perceptual relevance of all boundary types in the image, a measure of the overall perceptual significance of degradation of a signal can be determined, and provided as an output 38. The perceptual significance of errors in a degraded signal depends on the context in which they occur. For example, the loss or gain of a diagonal line (edge) in FIG. 7 would have little effect on the viewer's perception of the image, but the same error, if applied to FIG. 5, would have a much greater significance. Similarly, random dark specks would have a much greater effect on the legibility of FIG. 6 than they would on FIG. 4.

In more detail, the comparison process 33 consists of a number of individual elements. The first element identifies the closest match between the arrangements of the boundaries in the two images (34), and uses this to effect a bulk translation of one image with respect to the other (35) so that these boundaries correspond.

The next process 36 identifies features to which the human cognitive system is most sensitive, and weighting factors W are generated for such features. For example, it is possible to weight the cognitive relevance of critical image elements such as those responsible for visual speech cues, as it is known that certain facial features are principally responsible for visual speech cues. See for example Rosenblum, L. D., & Saldaña H. M. (1996). "*An audiovisual test of kinematic primitives for visual speech perception*". (Journal of Experimental Psychology: Human Perception and Performance, vol 22, pages 318-331) and Jordan, T. R. & Thomas, S. M. (1998). "*Anatomically guided construction of point-light facial images*". (Technical report. Human Perception and Communication Research Group, University of Nottingham, Nottingham, U.K).

We can infer that a face is present using pattern recognition or by virtue of the nature of the service delivering the image.

The perceptual significance of each boundary in one image is then compared with the corresponding boundary (if any) in the other (37), and an output 38 generated according to the degree of difference in such perceptual significance and the weightings W previously determined. It should be noted that differences in how the boundary is defined (hard edge, colour difference, etc) do not necessarily affect the perceptual significance of the boundary, so all the boundaries, however defined, are compared together. Moreover, since the presence of a spurious boundary can be as perceptually significant as the absence of a real one, it is the absolute difference in perceptibility that is determined.

Note that degradation of the signal may have caused a boundary defined by, for example, an edge, to disappear, but the boundary may still be discernible because of some other difference such as colour, luminance or texture. The error image produced by established models (filtered and masked noise) provides an indication of the visible degradation of the image. The comparison process 37 includes a measure of the extent to which the essential content is maintained and offers an improved measure of the image intelligibility. In comparing the boundaries (step 37), the perceptual significance of a given boundary may depend on its nature. A boundary between different textures may be less well defined than one defined by an edge, and such reduced boundary perceptibility is taken into account in generating the output.

This process is suitable for great range of video quality assessment applications, where identification and comparison of the perceptual boundaries is necessary. A good example is given by very low bandwidth systems where a face is algorithmically reconstructed. This would be impossible for many of the previously known visual models to assess appropriately. The comparison of perceptual boundaries also enables the assessment of synthetic representations of images such as an animated talking face, in which the features of the image that facilitate subsequent cognitive interpretation as a face are of prime importance.

What is claimed is:

1. A computer implemented method of measuring the differences between a first video signal and a second video signal, said method comprising:
    processing the first and second video signals with a sensory emulation process and a subjective emulation process, the sensory emulation process modeling the physical sensitivity of the human visual system and the subjective emulation process modeling the subjective significance of any errors present in a video signal;
    analyzing the processed video signals to identify perceptually relevant boundaries and disregarding perceptually irrelevant boundaries of video images depicted therein;
    comparing only said perceptually relevant boundaries so defined in the first signal with those in the second signal and disregarding said perceptually irrelevant boundaries, the comparison including determination of the extent to which the properties of boundaries defined in the first image are preserved in the second image; and
    generating an output indicative of perceptual difference between the first and second signals.

2. A method as in claim 1, in which the information content is analyzed for a plurality of boundary-identifying characteristics, and the properties of boundaries on which the comparison is based include characteristics by which such boundaries are defined in each of the signals.

3. A method as in claim 2, wherein the characteristics include the presence of edges.

4. A method as in claim 2, wherein the characteristics include the presence of disparities between frames of the same signal.

5. A method as in claim 2, wherein the characteristics include changes in at least one of the properties of: luminance, color or texture.

6. A method as in claims 1, in which the comparison includes a comparison of perceptibility of corresponding boundaries identified in the first and second signals.

7. A method as in claim 1, in which the comparison of the images includes:
    identification of principal elements in each image, and
    compensation for differences in relative positions of said principal elements.

8. A method as in claim 1, in which the analysis includes identification of perceptually significant image features, and the output indicative of perceptual difference between the first and second signals is weighted according to cognitive relevance of such image features.

9. A method as in claim 8, in which perceptually significant image features are those characteristic of the human face.

10. A method as in claim 9, in which weighting is applied to the output according to significance of the feature in providing visual cues to speech.

11. A method as in claim 8, in which perceptually significant image features are those by which individual text characters are distinguished.

12. Apparatus for measuring the differences between a first video signal and a second video signal, said apparatus comprising:
    processing means for processing the first and second video signals with a sensory emulation process and a subjective emulation process, the sensory emulation process modeling the physical sensitivity of the human visual system and the subjective emulation process modeling the subjective significance of any errors present in a video signal;

analysis means for analyzing the processed video signals to identify perceptually relevant boundaries and for disregarding perceptually irrelevant boundaries of video images depicted therein;

comparison means for comparing only said perceptually relevant boundaries so defined in the first signal with those in the second signal and disregarding said perceptually irrelevant boundaries, the comparison including determination of the extent to which properties of boundaries defined in the first image are preserved in the second image; and means for generating an output indicative of perceptual difference between the first and second signals.

13. Apparatus as in claim 12, wherein:

the analysis means is arranged to analyze information content in the signals for a plurality of boundary-identifying characteristics, and the comparison means is arranged to compare characteristics by which such boundaries are defined in each of the signals.

14. Apparatus as in claim 13, wherein the analysis means includes means to identify the presence of edges.

15. Apparatus as in claim 13, wherein the analysis means includes means to identify the presence of disparities between frames of the same signal.

16. Apparatus as in claim 13, wherein the analysis means includes means to identify differences in at least one of the properties of: luminance, color or texture.

17. Apparatus as in claim 12, in which the comparison means includes means for determining perceptibility of the boundaries identified in the first and second signals.

18. Apparatus as in claim 12, in which the comparison means includes image matching means for identifying principal elements in each image and translation means for effecting translation of one image to compensate for differences in relative positions of such elements in the first and second images.

19. Apparatus as in claim 12, in which the comparison means includes weighting means for identifying perceptually significant image features, and weighting the output according to cognitive relevance of such image features.

* * * * *